(12) United States Patent
Tang

(10) Patent No.: US 11,736,943 B2
(45) Date of Patent: Aug. 22, 2023

(54) NETWORK ACCESS METHOD AND DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 44 days.

(21) Appl. No.: 17/216,620

(22) Filed: Mar. 29, 2021

(65) Prior Publication Data

US 2021/0219136 A1    Jul. 15, 2021

Related U.S. Application Data

(63) Continuation of application No. PCT/CN2018/115989, filed on Nov. 16, 2018.

(51) Int. Cl.
*H04W 12/08* (2021.01)
*H04W 12/72* (2021.01)
*H04W 48/16* (2009.01)

(52) U.S. Cl.
CPC ........... *H04W 12/08* (2013.01); *H04W 12/72* (2021.01); *H04W 48/16* (2013.01)

(58) Field of Classification Search
CPC ..... H04W 48/16; H04W 12/08; H04W 12/72; H04W 36/00; H04W 36/0069
See application file for complete search history.

(56) References Cited

U.S. PATENT DOCUMENTS

| 2013/0318573 | A1 | 11/2013 | Reunamaki et al. |
| 2015/0326612 | A1 | 11/2015 | Faccin et al. |
| 2017/0214682 | A1 | 7/2017 | Yano et al. |
| 2017/0303259 | A1 | 10/2017 | Lee et al. |
| 2019/0394745 | A1 | 12/2019 | Yu |
| 2022/0007180 | A1* | 1/2022 | Liao ............... H04W 12/06 |
| 2022/0038898 | A1* | 2/2022 | Stojanovski ...... H04W 60/04 |

FOREIGN PATENT DOCUMENTS

| CN | 101133618 A | 2/2008 |
| CN | 102685714 A | 9/2012 |
| CN | 104255064 A | 12/2014 |

(Continued)

OTHER PUBLICATIONS

First Office Action issued in corresponding Chinese Application No. 202010611566.3, dated Jun. 29, 2021, 17 pages.

(Continued)

*Primary Examiner* — Wayne H Cai
(74) *Attorney, Agent, or Firm* — Bayes PLLC

(57) ABSTRACT

This application discloses a network access method and a device, so that network security can be improved, and a service can be correctly performed. The method includes obtaining, by a terminal device, first information, where the first information is used to indicate whether the terminal device is allowed to simultaneously access a second network when accessing a first network; and determining, by the terminal device according to the first information, whether to initiate an access request to the second network when the terminal device accesses the first network.

16 Claims, 5 Drawing Sheets

(56) References Cited

FOREIGN PATENT DOCUMENTS

| | | |
|---|---|---|
| CN | 104469762 A | 3/2015 |
| CN | 108024314 A | 5/2018 |
| CN | 108323245 A | 7/2018 |
| CN | 108574969 A | 9/2018 |
| EP | 2890180 A1 | 7/2015 |
| EP | 3576471 A1 | 4/2019 |
| WO | 2013029672 A1 | 3/2013 |
| WO | 2015/124579 A1 | 8/2015 |
| WO | 2018075233 A2 | 4/2018 |
| WO | 2018082673 A1 | 5/2018 |

OTHER PUBLICATIONS

Extended European Search Report issued in corresponding European application No. EP 18940269.6, dated Jul. 12, 2021, 9 pages.

"3rd Generation Partnership Project; Technical Specification Group Services and System Aspects; Study on Enhancement of Network Slicing (Release 16)", 3GPP TR 23.740 V0.6.0 (Oct. 2018), 68 pages.

Second Office Action issued in corresponding European application No. 18940269.6, dated Aug. 3, 2022.

First Office Action issued in corresponding India Application No. 202127013130, dated Feb. 4, 2022, 6 pages.

First Office Action issued in corresponding European Application No. 18940269.6, dated Mar. 16, 2022, 5 pages.

Second Office Action issued in corresponding Chinese Application No. 202010611566.3, dated Sep. 27, 2021, 16 pages.

Notifiation to Grant Patent Right for Invention issued in corresponding Chinese Application No. 202010611566.3, dated Dec. 14, 2021, 8 pages.

"Access Control for 5G Vertical and LAN Services", Agenda Item: 6.15, Source: Nokia, Nokia Shanghai Bell, SA WG2 Meeting #128-Bis S2-188992, Aug. 20-24, 2018, Sophia Antipolis, 3 pages.

"Solution for supporting Non-standalone NPN", Agenda Item: 6.15.3, Source: Interdigital Inc., SA WG2 Meeting #129 S2-1811375, Oct. 15-Oct. 19, 2018, Dongguan, China, 4 pages.

WO, International Search Report, PCT/CN2018/115989, dated Aug. 16, 2019, 32 pages.

PCT Written Opinion of the International Searching Authority issued in corresponding International Application No. PCT/CN2018/115989, dated Aug. 16, 2019, 9 pages.

First Office Action issued in corresponding Singaporean application No. 11202104890R, dated Mar. 30, 2023.

\* cited by examiner

NETWORK ACCESS METHOD AND DEVICE

CROSS-REFERENCE TO RELATED APPLICATIONS

The present application is a continuation application of International Application No. PCT/CN2018/115989, entitled "NETWORK ACCESS METHOD AND DEVICE" filed on Nov. 16, 2018, the entire contents of which are incorporated herein by reference.

BACKGROUND

Embodiments of this application relate to the field of communications, and more specifically, to a network access method and a device.

Currently, a requirement of a vertical local access network (VLAN) is introduced in a fifth-generation (5G) system, which is also referred to as new radio (NR). The VLAN is also referred to as a non-public network (NPN). When a terminal device accesses a VLAN with relatively high confidentiality, how to ensure that the VLAN is secure, and a service is correctly performed becomes a problem that urgently needs to be solved.

SUMMARY

Embodiments of this application provide a network access method and a device.

According to a first aspect, a network access method is provided, including: obtaining, by a terminal device, first information, where the first information is used to indicate whether the terminal device is allowed to simultaneously access a second network when accessing a first network; and determining, by the terminal device according to the first information, whether to initiate an access request to the second network when the terminal device accesses the first network.

According to a second aspect, a network access method is provided, including: sending, by a terminal device that has accessed a first network, an access request message to a first network element of a second network, where the access request message includes indication information, and the indication information is used to indicate that the terminal device has accessed the first network; and receiving, by the terminal device, an access denied message or an access allowed message that is sent by the first network element.

According to a third aspect, a network access method is provided, including: receiving, by a first network element of a second network, an access request message sent by a terminal device that has accessed a first network; determining, by the first network element, first information, where the first information is used to indicate whether the terminal device is allowed to simultaneously access the second network when accessing the first network; and sending, by the first network element, an access denied message or an access allowed message to the terminal device according to the first information.

According to a fourth aspect, a network access method is provided, including: determining, by a second network element, first information when a first network element of a second network receives an access request message sent by a terminal device that has accessed a first network, where the first information is used to indicate whether the terminal device is allowed to simultaneously access the second network when accessing the first network, and the first network and the second network share the second network element; and sending, by the second network element, the first information to the first network element, where the first information is used by the first network element to determine whether to send an access denied message or an access allowed message to the terminal device.

According to a fifth aspect, a terminal device is provided. The terminal device may perform the method according to any one of the first aspect or optional implementations of the first aspect. Specifically, the terminal device may include functional modules configured to perform the method according to any one of the first aspect or the possible implementations of the first aspect.

According to a sixth aspect, a terminal device is provided. The terminal device may perform the method according to any one of the second aspect or optional implementations of the second aspect. Specifically, the terminal device may include functional modules configured to perform the method according to any one of the second aspect or the possible implementations of the second aspect.

According to a seventh aspect, a network device is provided. The network device may perform the method according to any one of the third aspect or optional implementations of the third aspect. Specifically, the network device may include functional modules configured to perform the method according to any one of the third aspect or the possible implementations of the third aspect.

According to an eighth aspect, a network device is provided. The network device may perform the method according to any one of the fourth aspect or optional implementations of the fourth aspect. Specifically, the network device may include functional modules configured to perform the method according to any one of the fourth aspect or the possible implementations of the fourth aspect.

According to a ninth aspect, a terminal device is provided, including a processor and a memory. The memory is configured to store a computer program, and the processor is configured to invoke and run the computer program stored in the memory, to perform the method according to any one of the first aspect or the possible implementations of the first aspect.

According to a tenth aspect, a terminal device is provided, including a processor and a memory. The memory is configured to store a computer program, and the processor is configured to invoke and run the computer program stored in the memory, to perform the method according to any one of the second aspect or the possible implementations of the second aspect.

According to an eleventh aspect, a network device is provided, including a processor and a memory. The memory is configured to store a computer program, and the processor is configured to invoke and run the computer program stored in the memory, to perform the method according to any one of the third aspect or the possible implementations of the third aspect.

According to a twelfth aspect, a network device is provided, including a processor and a memory. The memory is configured to store a computer program, and the processor is configured to invoke and run the computer program stored in the memory, to perform the method according to any one of the fourth aspect or the possible implementations of the fourth aspect.

According to a thirteenth aspect, a chip is provided, configured to implement the method according to any one of the first aspect or the possible implementations of the first aspect. Specifically, the chip includes a processor, which is configured to invoke a computer program from a memory and run the computer program, so that a device having the chip installed therein is enabled to perform the method according to any one of the first aspect or the possible implementations of the first aspect.

According to a fourteenth aspect, a chip is provided, configured to implement the method according to any one of the second aspect or the possible implementations of the second aspect. Specifically, the chip includes a processor, which is configured to invoke a computer program from a memory and run the computer program, so that a device having the chip installed therein is enabled to perform the method according to any one of the second aspect or the possible implementations of the second aspect.

According to a fifteenth aspect, a chip is provided, configured to implement the method according to any one of the third aspect or the possible implementations of the third aspect. Specifically, the chip includes a processor, which is configured to invoke a computer program from a memory and run the computer program, so that a device having the chip installed therein is enabled to perform the method according to any one of the third aspect or the possible implementations of the third aspect.

According to a sixteenth aspect, a chip is provided, configured to implement the method according to any one of the fourth aspect or the possible implementations of the fourth aspect. Specifically, the chip includes a processor, which is configured to invoke a computer program from a memory and run the computer program, so that a device having the chip installed therein is enabled to perform the method according to any one of the fourth aspect or the possible implementations of the fourth aspect.

According to a seventeenth aspect, a computer-readable storage medium is provided. The computer-readable storage medium is configured to store a computer program. The computer program enables a computer to perform the method according to any one of the first aspect or the possible implementations of the first aspect.

According to an eighteenth aspect, a computer-readable storage medium is provided. The computer-readable storage medium is configured to store a computer program. The computer program enables a computer to perform the method according to any one of the second aspect or the possible implementations of the second aspect.

According to a nineteenth aspect, a computer-readable storage medium is provided. The computer-readable storage medium is configured to store a computer program. The computer program enables a computer to perform the method according to any one of the third aspect or the possible implementations of the third aspect.

According to a twentieth aspect, a computer-readable storage medium is provided. The computer-readable storage medium is configured to store a computer program. The computer program enables a computer to perform the method according to any one of the fourth aspect or the possible implementations of the fourth aspect.

According to a twenty-first aspect, a computer program product is provided. The computer program product includes a computer program instruction. The computer program instruction enables a computer to perform the method according to any one of the first aspect or the possible implementations of the first aspect.

According to a twenty-second aspect, a computer program product is provided. The computer program product includes a computer program instruction. The computer program instruction enables a computer to perform the method according to any one of the second aspect or the possible implementations of the second aspect.

According to a twenty-third aspect, a computer program product is provided. The computer program product includes a computer program instruction. The computer program instruction enables a computer to perform the method according to any one of the third aspect or the possible implementations of the third aspect.

According to a twenty-fourth aspect, a computer program product is provided. The computer program product includes a computer program instruction. The computer program instruction enables a computer to perform the method according to any one of the fourth aspect or the possible implementations of the fourth aspect.

According to a twenty-fifth aspect, a computer program is provided, where the computer program, when run on a computer, enables the computer to perform the method according to any one of the first aspect or the possible implementations of the first aspect.

According to a twenty-sixth aspect, a computer program is provided, where the computer program, when run on a computer, enables the computer to perform the method according to any one of the second aspect or the possible implementations of the second aspect.

According to a twenty-seventh aspect, a computer program is provided, where the computer program, when run on a computer, enables the computer to perform the method according to any one of the third aspect or the possible implementations of the third aspect.

According to a twenty-eighth aspect, a computer program is provided, where the computer program, when run on a computer, enables the computer to perform the method according to any one of the fourth aspect or the possible implementations of the fourth aspect.

According to a twenty-ninth aspect, a communications system is provided, including a terminal device and a network device.

The terminal device is configured to: send, when the terminal device has accessed a first network, an access request message to a first network element of a second network, where the access request message includes indication information, and the indication information is used to indicate that the terminal device has accessed the first network; and receive an access denied message or an access allowed message that is sent by the first network element.

The network device is the first network element of the second network. The network device is configured to: receive the access request message sent by the terminal device that has accessed the first network; determine first information, where the first information is used to indicate whether the terminal device is allowed to simultaneously access the second network when accessing the first network; and send the access denied message or the access allowed message to the terminal device according to the first information.

Specifically, the terminal device is configured to perform the method according to any one of the second aspect or the possible implementations of the second aspect, or the network device is configured to perform the method according to any one of the third aspect or the possible implementations of the third aspect.

According to a thirtieth aspect, a communications system is provided, including a terminal device and a network device.

The terminal device is configured to: send, when the terminal device has accessed a first network, an access request message to a first network element of a second network, where the access request message includes indication information, and the indication information is used to indicate that the terminal device has accessed the first network; and receive an access denied message or an access allowed message that is sent by the first network element.

The network device is a second network element. The network device is configured to: determine first information when the first network element of the second network receives the access request message sent by the terminal device that has accessed the first network, where the first information is used to indicate whether the terminal device is allowed to simultaneously access the second network when accessing the first network, and the first network and the second network share the second network element; and send the first information to the first network element, where the first information is used by the first network element to determine whether to send the access denied message or the access allowed message to the terminal device.

Specifically, the terminal device is configured to perform the method according to any one of the second aspect or the possible implementations of the second aspect, or the network device is configured to perform the method according to any one of the fourth aspect or the possible implementations of the fourth aspect.

DETAILED DESCRIPTION

Technical solutions in embodiments of this application are described below with reference to the accompanying drawings in the embodiments of this application.

The technical solutions of the embodiments of this application may be applied to various communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, an LET Advanced (LTE-A) system, an NR system, an evolved system of an NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communications system, a wireless local area network (WLAN) system, a Wireless Fidelity (WiFi) system, a next generation communications system or another communications system.

Generally, a quantity of connections supported by a conventional communications system is limited and is easily implemented. However, with the development of communication technologies, a mobile communications system supports both conventional communication and communication such as device to device (D2D) communication, machine to machine (M2M) communication, machine type communication (MTC) or vehicle to vehicle (V2V) communication. The embodiments of this application may also be applied to these communications systems.

In addition, the communications system in the embodiments of this application may further be applied to, for example, a carrier aggregation (CA) scenario, a dual connectivity (DC) scenario or a standalone (SA) network deployment scenario.

Figures 1, 2:
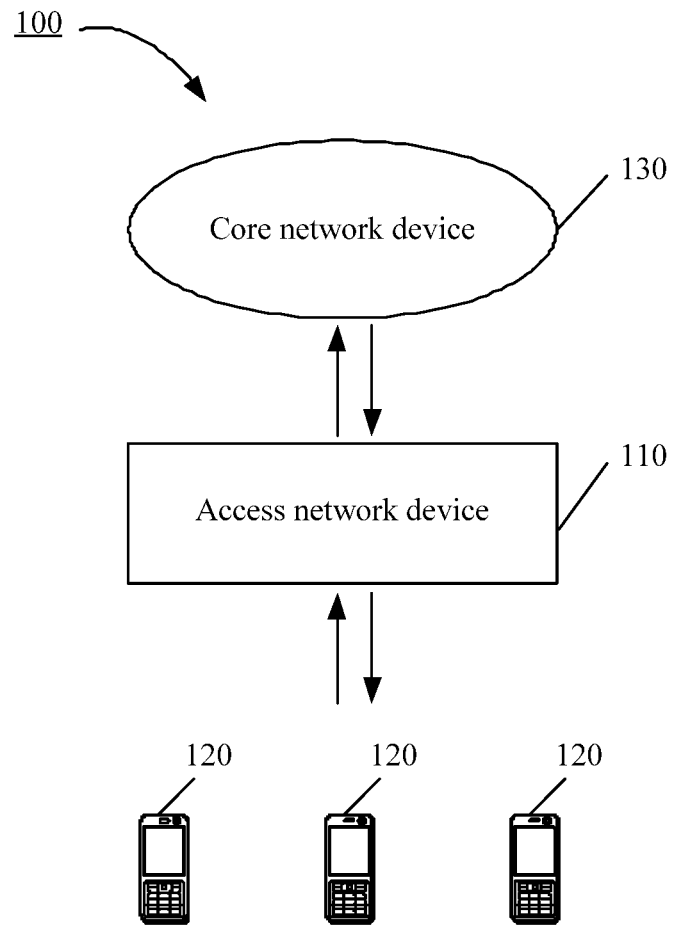
FIG. 1 is a schematic architectural diagram of an application scenario according to an embodiment of the present disclosure.
FIG. 2 is a schematic flowchart of a network access method according to an embodiment of the present disclosure.

For example, FIG. 1 shows a communications system 100 to which an embodiment of this application is applied. The wireless communications system 100 may include an access network device 110. The access network device 110 may be a device communicating with a terminal device. The access network device 110 may provide communication coverage for a particular geographical area and may communicate with a terminal device that is located in the coverage. Optionally, the access network device 110 may be a base transceiver station (BTS) in a GSM or CDMA system, or may be a NodeB (NB) in a WCDMA system, or may be an evolved NodeB (eNB or eNodeB) in an LTE system, a network side device in an NR system or a wireless controller in a cloud radio access network (CRAN), or the access network device 110 may be a relay station, an access point, an in-vehicle device, a wearable device, a network side device in a next generation network, a network side device in a future evolved public land mobile network (PLMN) or the like.

The communications system 100 further includes at least one terminal device 120 located within a coverage area of the access network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like. Optionally, the terminal devices 120 may also perform D2D communication with each other.

The access network device 110 may provide a service for a cell, and the terminal device 120 communicates with the access network device 110 by using a transmission resource (for example, a frequency domain resource or a spectrum resource) used by the cell. The cell may be a cell corresponding to the access network device 110 (for example, a base station). The cell may belong to a macro base station or may belong to a base station corresponding to a small cell. The small cell herein may include a metro cell, a micro cell, a pico cell, a femto cell, and the like. These small cells have features of small coverage and low transmit power and are suitable for providing high-speed data transmission services.

The communications system 100 further includes a core network device 130 communicating with the access network device 110. Optionally, the core network device 130 may be a core network device in a 5G system. For example, an access and mobility management function (AMF) is responsible for managing access and mobility, and includes functions of authenticating a user, switching, and location updating or the like. For another example, a session management function (SMF) is responsible for managing a session, including establishment, modification, release, and the like of a packet data unit (PDU) session. For another example, a user plane function (UPF) is responsible for forwarding user data. Optionally, the core network device 130 may also be a core network device of an LTE system or another system.

For example, FIG. 1 shows one access network device, one core network device, and three terminal devices, but this application is not limited thereto. The wireless communications system 100 may further include a plurality of core network devices, or may include a plurality of access network devices, and another quantity of terminal devices may further be included in a coverage area of each access network device. This is not limited in the embodiments of this application.

FIG. 2 is a schematic flowchart of a network access method according to an embodiment of this application. The method shown in FIG. 2 may be performed by a terminal device. The terminal device may be, for example, the terminal device 120 shown in FIG. 1.

A first network and a second network are not limited in this embodiment of this application. The first network may be, for example, an NPN, and the second network may be, for example, a PLMN. If a terminal device accessing an NPN is no longer allowed to access a PLMN, the NPN may be referred to as a standalone NPN. If a terminal device accessing an NPN is allowed to simultaneously access a PLMN, the NPN may be referred to as a non-standalone NPN.

As shown in FIG. 2, the network access method includes the following steps.

210: A terminal device obtains first information.

The first information is used to indicate whether the terminal device is allowed to simultaneously access a second network when accessing a first network.

220: The terminal device determines, according to the first information, whether to initiate an access request to the second network when the terminal device accesses the first network.

In this embodiment, when accessing the first network, the terminal device obtains the first information to determine whether the terminal device is allowed to simultaneously access the second network when accessing the first network, so as to determine, according to the first information, whether to initiate the access request to the second network. For the sake of confidentiality or the like, when the first network does not allow the terminal device that has accessed the first network to simultaneously access another network, the first information indicates that simultaneous access is not allowed. After obtaining the first information, the terminal device that has accessed the first network does not initiate the access request to the second network, so that it is ensured that the first network is secure, and a service is correctly performed.

Herein, the simultaneously accessing the second network when accessing a first network includes: separately accessing, by the terminal device, the first network and the second network; and/or accessing, by the terminal device, the first network, and accessing the second network via the first network.

It should be understood that, in this embodiment of this application, the "the terminal device is allowed to simultaneously access a second network when accessing a first network" is also referred to as "access allowed" for short. For example, if a network allows the terminal device to access simultaneously, the terminal device is allowed to simultaneously access the network and another network.

When the first information indicates that the terminal device is not allowed to simultaneously access the second network when accessing the first network, the terminal device does not simultaneously access the two networks; and when the first information indicates that the terminal device is allowed to simultaneously access the second network when accessing the first network, the terminal device can access another network when accessing one of the networks.

Optionally, in 210, the obtaining, by a terminal device, first information includes obtaining, by the terminal device, the first information from a universal subscriber identity module (USIM) of the terminal device or a memory of the terminal device.

That is, the first information may be stored in the terminal device in advance.

Optionally, in 210, the obtaining, by a terminal device, first information includes: receiving the first information sent by a second network element of the second network before the terminal device accesses the first network.

The second network element may be, for example, an AMF or unified data management (UDM).

The terminal device can access the second network before accessing the first network, and the second network element of the second network sends the first information to the terminal device. When the terminal device is disconnected from the second network and then accesses the first network, the terminal device may determine, according to the first information, whether the terminal device may further continue to initiate an access request to the second network when the terminal device accesses the first network.

Optionally, in 210, the obtaining, by a terminal device, first information includes: receiving the first information sent by a first network element of the first network after the terminal device accesses the first network.

The first network element may be, for example, an AMF, an SMF or a UPF.

Optionally, the first information is a data network name (DNN) or single-network slice selection assistance information (S-NSSAI).

For example, the first information may be carried in a particular DNN or S-NSSAI. The first network may be uniquely determined according to the particular DNN or S-NSSAI. If the terminal device receives the DNN or S-NSSAI corresponding to the first network, it is determined that the first network allows the terminal device to access another network when accessing the first network.

For another example, the first information may be an identifier of the first network. The first information received by the terminal device includes the identifier of the first network, and it is determined that the first network allows the terminal device to access another network when accessing the first network.

For another example, the first information may further include the identifier of the first network and a corresponding bit. A value in the bit is used to indicate whether the first network allows the terminal device to access another network when accessing the first network. For example, when the value in the bit is 1, it indicates that simultaneous access is allowed, and when the value in the bit is 0, it indicates that simultaneous access is not allowed.

Alternatively, the content included in the first information may be in another form. This is not limited in this embodiment of this application provided that the content may indicate whether the terminal device is allowed to simultaneously access the second network when accessing the first network.

The content of the first information is not limited in this embodiment of this application provided that the content may indicate whether the terminal device is allowed to simultaneously access the second network when accessing the first network. In addition, the first information may implicitly or explicitly indicate whether the terminal device is allowed to simultaneously access the second network when accessing the first network.

Optionally, in 220, the determining, by the terminal device according to the first information, whether to initiate an access request to the second network includes: determining, by the terminal device according to whether the first information includes an identifier of the first network, whether to initiate the access request to the second network.

For example, the first information includes an identifier of at least one network that allows simultaneous access of the terminal device. If the first information includes the identifier of the first network, that is, the at least one network includes the first network, the terminal device determines to initiate the access request to the second network; and if the first information does not include the identifier of the first network, the terminal device determines not to initiate the access request to the second network.

For another example, as shown in Table 1, the first information includes identifiers of a plurality of networks to which the terminal device has subscribed and information about whether the networks allow simultaneous access. In Table 1, if the first network is a network 1, the terminal device may determine, according to the first information, that the terminal device can simultaneously access another network when accessing the network 1; if the first network is a network 2, the terminal device may determine, according to the first information, that the terminal device cannot simultaneously access another network when accessing the network 2; . . . ; and if the first network is a network N, the terminal device may determine, according to the first information, that the terminal device can simultaneously access another network when accessing the network N.

TABLE 1

| Identifier of a subscribed network | Whether simultaneous access is allowed |
|---|---|
| Network 1 | Allowed |
| Network 2 | Not allowed |
| . . . | . . . |
| Network N | Allowed |

Figure 3:
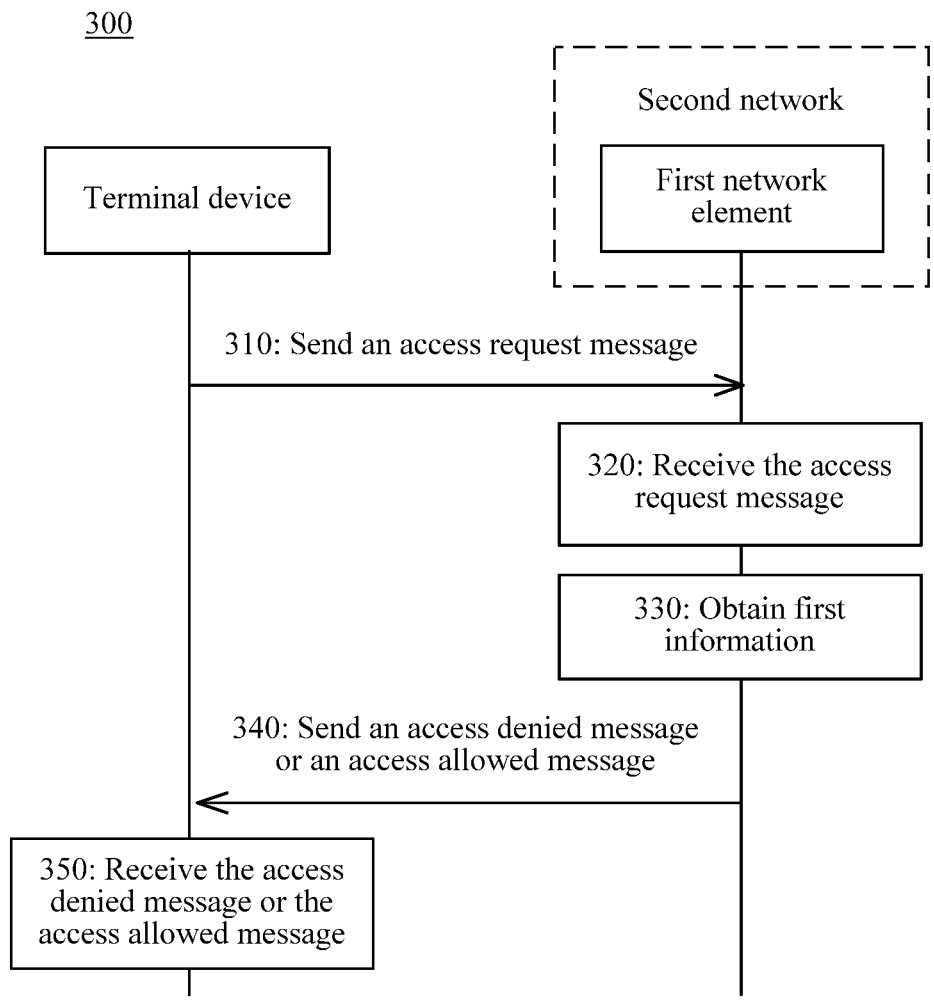
FIG. 3 is a schematic flowchart of a network access method according to another embodiment of the present disclosure.

FIG. 3 is a schematic interaction diagram of a network access method according to an embodiment of this application. The method shown in FIG. 3 may be performed by a terminal device and a network device. The terminal device may be, for example, the terminal device 120 shown in FIG. 1. The network device may be, for example, the core network device 130 shown in FIG. 1. The network device is the first network element in the second network.

The first network and the second network are not limited in this embodiment of this application. The first network may be, for example, an NPN, and the second network may be, for example, a PLMN.

As shown in FIG. 3, the network access method includes the following steps.

310: A terminal device that has accessed a first network sends an access request message to a first network element of a second network.

The access request message may be, for example, a registration request or a PDU session establishment request.

320: The first network element receives the access request message sent by the terminal device.

The first network element may be, for example, an AMF, an SMF or a UPF.

330: The first network element determines first information.

The first information is used to indicate whether the terminal device is allowed to simultaneously access the second network when accessing the first network.

340: The first network element sends an access denied message or an access allowed message to the terminal device according to the first information.

350: The terminal device receives the access denied message or the access allowed message that is sent by the first network element.

In this embodiment, when the terminal device has accessed the first network and attempts to initiate access to the second network, the second network determines the first information and denies or allows access of the terminal device according to the first information. For the sake of confidentiality or the like, when the first network does not allow the terminal device that has accessed the first network to simultaneously access another network, the first information indicates that simultaneous access is not allowed. After obtaining the first information, the second network rejects the access request initiated by the terminal device, so that it is ensured that the first network is secure, and a service is correctly performed.

Herein, the simultaneously accessing the second network when accessing the first network includes: separately accessing, by the terminal device, the first network and the second network; and/or accessing, by the terminal device, the first network, and accessing the second network via the first network.

If the first information indicates that the terminal device is not allowed to simultaneously access the second network when accessing the first network, the terminal device does not simultaneously access the two networks; and if the first information indicates that the terminal device is allowed to simultaneously access the second network when accessing the first network, the terminal device can access another network when accessing one of the networks.

Descriptions are made based on two cases. In one case, the first network and the second network do not share the second network element. In the other case, the first network and the second network share the second network element. The terminal device may be informed of whether the first network and the second network share the second network element when the terminal device accesses the first network or the second network. That the second network element is UDM is used as an example for description, but this is not limited in this application.

Case 1

Because the first network and the second network do not share the second network element, that is, the second network element of the first network and the second network element of the second network are separate, the second network does not know a current network access status of the terminal device.

Therefore, optionally, the access request message sent by the terminal device in 310 includes indication information, where the indication information is used to indicate that the terminal device has accessed the first network.

For example, the indication information may include an identifier of the first network.

For another example, the indication information may include the identifier of the first network and a corresponding bit. A value in the bit is used to indicate whether the terminal device has accessed the first network. For example, when the value in the bit is 0, it indicates that the terminal device does not access the first network, and when the value in the bit is 1, it indicates that the terminal device has accessed the first network.

Optionally, in 330, the determining, by the first network element, first information includes: receiving, by the first network element, an identifier, sent by the second network element of the second network of at least one network that allows simultaneous access of the terminal device; and determining, by the first network element, the first information according to whether the at least one network includes the first network.

Alternatively, optionally, in 330, the determining, by the first network element, first information includes: obtaining, by the first network element, a locally configured identifier of at least one network that allows simultaneous access of the terminal device; and determining, by the first network element, the first information according to whether the at least one network includes the first network.

That is, the first network element may obtain the identifier of at least one network that allows simultaneous access of the terminal device locally or from the second network element and determine the first information according to whether the at least one network includes the first network. If the identifier of the at least one network includes the identifier of the first network, the first network element determines that the first information is that the terminal device is allowed to simultaneously access the second network when accessing the first network; and if the identifier of the at least one network does not include the identifier of the first network, the first network element determines that the first information is that the terminal device is not allowed to simultaneously access the second network when accessing the first network.

For example, as shown in Table 2, the first network element receives identifiers of a plurality of networks to which the terminal device has subscribed and information about whether the networks allow simultaneous access from the second network element. In Table 2, when the first network is a network 1, the terminal device is allowed to simultaneously access the second network; when the first network is a network 2, the terminal device is not allowed to simultaneously access the second network; when the first network is a network 3, the terminal device is allowed to simultaneously access the second network; and when the first network is a network 4, the terminal device is allowed to simultaneously access the second network. Therefore, when the first network is the network 1, the network 3 or the network 4, the first network element determines that the first information is that the terminal device is allowed to simultaneously access the second network when accessing the first network; and when the first network is the network 2, the first network element determines that the first information is that the terminal device is not allowed to simultaneously access the second network when accessing the first network.

TABLE 2

| Identifier of a subscribed network | First information |
| --- | --- |
| Network 1 | Allowed |
| Network 2 | Not allowed |
| Network 3 | Allowed |
| Network 4 | Allowed |

It should be understood that, when the identifier, obtained by the first network element locally or from the second network element of at least one network that allows simultaneous access of the terminal device is "none", the first network element determines that the first information is that the terminal device is not allowed to simultaneously access the second network when accessing the first network.

Case 2

Because the first network and the second network share the second network element, that is, the second network element of the first network and the second network element of the second network are the same network element, the second network may obtain a current network access status of the terminal device.

Therefore, the access request message sent by the terminal device in 310 may carry no indication information to indicate that the terminal device has accessed the first network.

Optionally, in 330, the determining, by the first network element, first information includes: receiving, by the first network element, an identifier of the first network or an AMF identifier of the first network sent by a second network element; obtaining, by the first network element, a locally configured identifier of at least one network that allows simultaneous access of the terminal device; and determining, by the first network element, the first information according to whether the at least one network includes the first network.

The AMF identifier is used to determine the identifier of the first network. Identifiers of AMFs of different networks may be different. The second network element may send the AMF identifier of the first network to the first network element, and the first network element may determine the identifier of the first network according to the ANF identifier.

That is, the first network element may obtain the identifier of the first network from the second network element, obtain the identifier of at least one network that allows simultaneous access of the terminal device locally, and determine the first information according to whether the at least one network includes the first network. If the identifier of the at least one network includes the identifier of the first network, the first network element determines that the first information is that the terminal device is allowed to simultaneously access the second network when accessing the first network; and if the identifier of the at least one network does not include the identifier of the first network, the first network element determines that the first information is that the terminal device is not allowed to simultaneously access the second network when accessing the first network.

It should be understood that, when the identifier, obtained by the first network element locally or from the second network element of at least one network that allows simultaneous access of the terminal device is "none", the first network element determines that the first information is that the terminal device is not allowed to simultaneously access the second network when accessing the first network.

For example, as shown in Table 3, the first network element may obtain identifiers of a plurality of networks to which the terminal device has subscribed and information about whether the networks allow simultaneous access locally. In Table 3, when the first network is a network 1, the terminal device is not allowed to simultaneously access the second network; when the first network is a network 2, the terminal device is not allowed to access the second network; and when the first network is a network 3, the terminal device is not allowed to access the second network. Therefore, when the first network is the network 1, the network 2 or the network 3, the first network element determines that the first information is that the terminal device is not allowed to simultaneously access the second network when accessing the first network.

TABLE 3

| Identifier of a subscribed network | First information |
| --- | --- |
| Network 1 | Not allowed |
| Network 2 | Not allowed |
| Network 3 | Not allowed |

Optionally, in 330, the determining, by the first network element, first information includes: receiving, by the first network element, the first information sent by a second network element.

In this case, the second network element determines the first information, and sends the first information to the first network element, so that the first network element sends the access allowed message or the access denied message to the terminal device according to the received first information.

Figure 4:
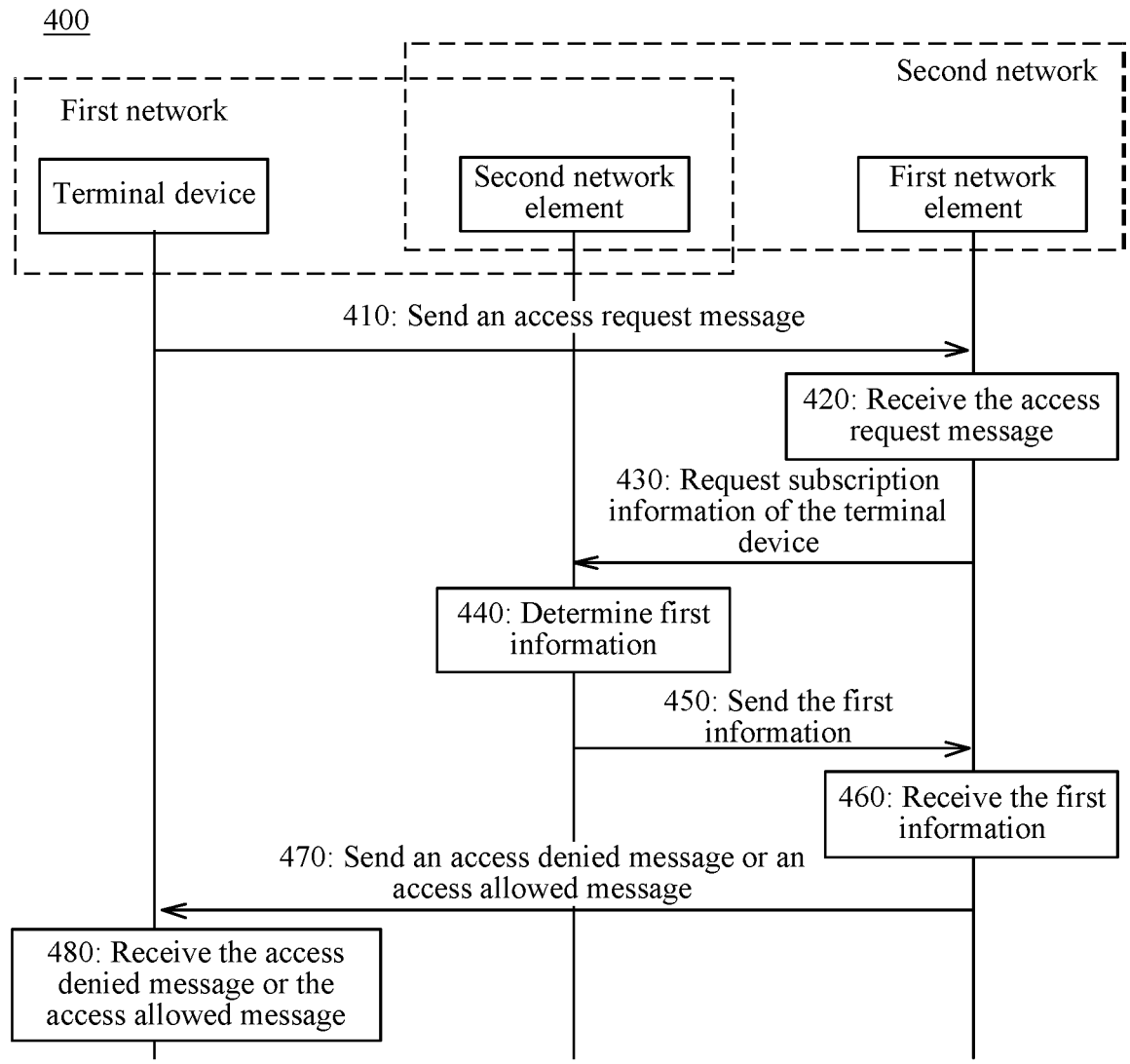
FIG. 4 is a schematic flowchart of a network access method according to another embodiment of the present disclosure.

Descriptions are specifically made in the following with reference to FIG. 4. FIG. 4 is a schematic interaction diagram of a network access method according to another embodiment of this application. As shown in FIG. 4, the network access method includes the following steps.

410: A terminal device that has accessed a first network sends an access request message to a first network element of a second network.

420: The first network element receives the access request message sent by the terminal device that has accessed the first network.

430: The first network element requests subscription information of the terminal device from a second network element.

Specifically, the first network element sends a request message to the second network element, where the request message is used to request the subscription information of the terminal device. The second network element receives the request message, to learn about that the terminal device requests to access the second network, thereby performing 440.

Particularly, the first network element may inform the second network element that the terminal device requests to access the second network by using other indication information.

440: The second network element determines first information.

The first information is used to indicate whether the terminal device is allowed to simultaneously access the second network when accessing the first network, and the first network and the second network share the second network element.

450: The second network element sends the first information to the first network element.

The first information is used by the first network element to determine whether to send an access denied message or an access allowed message to the terminal device.

460: The first network element receives the first information sent by the second network element.

470: The first network element sends an access denied message or an access allowed message to the terminal device according to the first information.

480: The terminal device receives the access denied message or the access allowed message that is sent by the first network element.

In this embodiment, when the first network element of the second network receives the access request message sent by the terminal device that has accessed the first network, the second network element determines the first information and sends the first information to the first network element.

Optionally, in 440, the determining, by the second network element, first information includes: obtaining, by the second network element, a locally configured identifier of at least one network that allows simultaneous access of the terminal device; and determining, by the second network element, the first information according to whether the at least one network includes the first network.

That is, the second network element may obtain the identifier of at least one network that allows simultaneous access of the terminal device locally and determine the first information according to whether the at least one network includes the first network. If the identifier of the at least one network includes the identifier of the first network, the second network element determines that the first information is that the terminal device is allowed to simultaneously access the second network when accessing the first network; and if the identifier of the at least one network does not include the identifier of the first network, the second network element determines that the first information is that the terminal device is not allowed to simultaneously access the second network when accessing the first network.

For example, as shown in the foregoing Table 2, the second network element may obtain identifiers of a plurality of networks to which the terminal device has subscribed and information about whether the networks allow simultaneous access locally. In Table 2, when the first network is a network 1, the terminal device is allowed to simultaneously access the second network; when the first network is a network 2, the terminal device is not allowed to simultaneously access the second network; when the first network is a network 3, the terminal device is allowed to simultaneously access the second network; and when the first network is a network 4, the terminal device is allowed to simultaneously access the second network. Therefore, when the first network is the network 1, the network 3 or the network 4, the second network element determines that the first information is that the terminal device is allowed to simultaneously access the second network when accessing the first network; and when the first network is the network 2, the second network element determines that the first information is that the terminal device is not allowed to simultaneously access the second network when accessing the first network.

It should be understood that, when the identifier, obtained by the second network element locally, of at least one network that allows simultaneous access of the terminal device is "none", the first network element determines that the first information is that the terminal device is not allowed to simultaneously access the second network when accessing the first network.

It should further be understood that, in this embodiment of this application, when determining the first information, the first network element or the second network element may obtain identifiers of networks that do not allow simultaneous access of the terminal device and determine the first information according to whether the networks include the first network. If the identifiers of the networks do not include the identifier of the first network, it is determined that the first information is that the terminal device is allowed to simultaneously access the second network when accessing the first network; and if the identifiers of the networks include the identifier of the first network, the second network element determines that the first information is that the terminal device is not allowed to simultaneously access the second network when accessing the first network.

Alternatively, the first information corresponding to the identifier of the first network may be determined from correspondences between a network identifier shown in Table 2 and Table 3 and the first information according to the identifier of the first network. A specific implementation process of determining the first information is not limited in this embodiment of this application.

It needs to be noted that, the embodiments of this application and/or technical features in the embodiments may be combined randomly without conflict, and technical solutions obtained after combination may further fall into the scope of protection of this application.

It should be understood that in various embodiments of this application, an order of sequence numbers of the foregoing processes does not indicate an execution sequence, and execution sequences of the processes should be determined according to functions and internal logic thereof and should not impose any limitation on an implementation process of the embodiments of this application.

The communication method according to the embodiments of this application is described above in detail. Apparatuses according to the embodiments of this application are described below with reference to FIG. 5 to FIG. 12. Technical features described in the method embodiments are applicable to the following apparatus embodiments.

Figure 5:
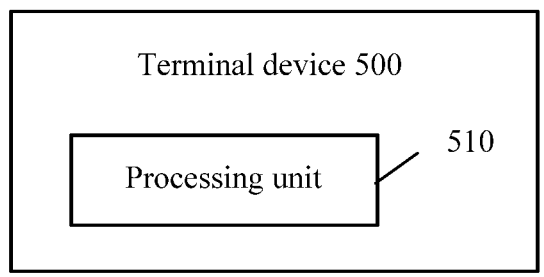
FIG. 5 is a schematic block diagram of a terminal device according to an embodiment of the present disclosure.

FIG. 5 is a schematic block diagram of a terminal device 500 according to an embodiment of this application. As shown in FIG. 5, the terminal device 500 includes: a processing unit 510, configured to obtain first information, where the first information is used to indicate whether the terminal device is allowed to simultaneously access a second network when accessing a first network, where the processing unit 510 is further configured to determine, according to the first information, whether to initiate an access request to the second network when the terminal device accesses the first network.

Therefore, after accessing a first network, a terminal device obtains first information to determine whether to initiate an access request to a second network, where the first information indicates whether the terminal device is allowed to simultaneously access the second network when accessing the first network. Therefore, it is ensured that the first network is secure, and a service is correctly performed.

Optionally, the simultaneously accessing a second network when accessing a first network includes: separately accessing, by the terminal device, the first network and the second network; and/or accessing, by the terminal device, the first network, and accessing the second network via the first network.

Optionally, the processing unit 510 is specifically configured to obtain the first information from a USIM of the terminal device or a memory of the terminal device.

Optionally, the terminal device 500 further includes a receiving unit, where the processing unit 510 is specifically configured to: receive, by using the receiving unit, the first information sent by a second network element of the second network before the terminal device accesses the first network.

Optionally, the second network element is an AMF or UDM.

Optionally, the terminal device 500 further includes a receiving unit, where the processing unit 510 is specifically configured to: receive, by using the receiving unit, the first information sent by a first network element of the first network after the terminal device accesses the first network.

Optionally, the first network element is any one of the following: an AMF, an SMF, and a UPF.

Optionally, the first information is a DNN or S-NSSAI.

Optionally, the processing unit 510 is specifically configured to: determine, according to whether the first information includes an identifier of the first network, whether to initiate the access request to the second network.

Optionally, the first network is an NPN, and the second network is a PLMN.

It should be understood that the terminal device 500 may perform corresponding operations performed by the terminal device in the foregoing method. For brevity, details are not described herein again.

Figure 6:
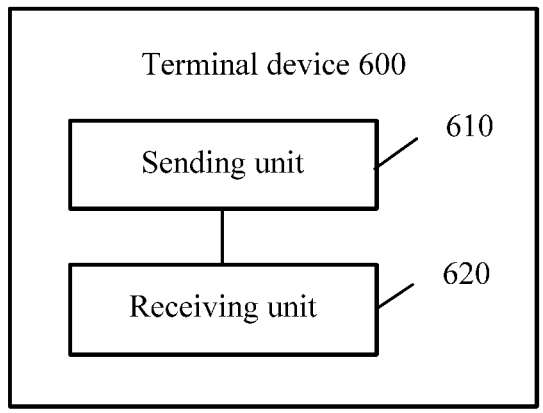
FIG. 6 is a schematic block diagram of a terminal device according to another embodiment of the present disclosure.

FIG. 6 is a schematic block diagram of a terminal device 600 according to an embodiment of this application. As shown in FIG. 6, the terminal device has accessed a first network, and the terminal device 600 includes: a sending unit 610, configured to send an access request message to a first network element of a second network, where the access request message includes indication information, and the indication information is used to indicate that the terminal device has accessed the first network; and a receiving unit 620, configured to receive an access denied message or an access allowed message that is sent by the first network element.

Therefore, the terminal device adds indication information to the access request message to indicate that the terminal device has accessed the first network, so that the second network determines first information according to the indication information and denies or allows access of the terminal device according to the first information, thereby ensuring that the first network is secure, and a service is correctly performed.

Optionally, the indication information includes an identifier of the first network.

Optionally, the first network element is any one of the following: an AMF, an SMF, and a UPF.

Optionally, the first network is an NPN, and the second network is a PLMN.

It should be understood that the terminal device 600 may perform corresponding operations performed by the terminal device in the foregoing method 300. For brevity, details are not described herein again.

Figure 7:
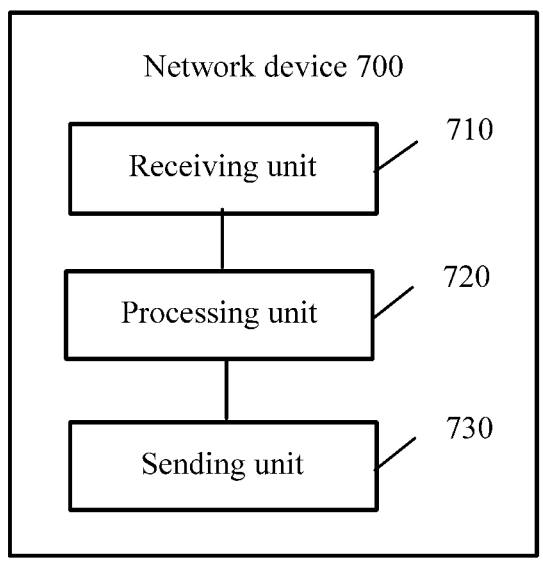
FIG. 7 is a schematic block diagram of a network device according to another embodiment of the present disclosure.

FIG. 7 is a schematic block diagram of a network device 700 according to an embodiment of this application. As shown in FIG. 7, the network device is a first network element of a second network, and the network device 700 includes: a receiving unit 710, configured to receive an access request message sent by a terminal device that has accessed a first network; a processing unit 720, configured to determine first information, where the first information is used to indicate whether the terminal device is allowed to simultaneously access the second network when accessing the first network; and a sending unit 730, configured to send an access denied message or an access allowed message to the terminal device according to the first information determined by the processing unit 720.

Therefore, when the terminal device has accessed the first network and attempts to initiate access to the second network, the second network determines the first information and denies or allows access of the terminal device according to the first information, thereby ensuring that the first network is secure, and a service is correctly performed.

Optionally, the simultaneously accessing a second network when accessing a first network includes: separately accessing, by the terminal device, the first network and the second network; and/or accessing, by the terminal device, the first network, and accessing the second network via the first network.

Optionally, the access request message includes indication information, and the indication information is used to indicate that the terminal device has accessed the first network.

Optionally, the indication information includes an identifier of the first network.

Optionally, the processing unit 720 is specifically configured to: receive, by using the receiving unit 610, an identifier, sent by a second network element of the second network of at least one network that allows simultaneous access of the terminal device; and determine the first information according to whether the at least one network includes the first network.

Optionally, the processing unit 720 is specifically configured to: obtain a locally configured identifier of at least one network that allows simultaneous access of the terminal device; and determine the first information according to whether the at least one network includes the first network.

Optionally, the processing unit 720 is specifically configured to: receive, by using the receiving unit 710, an identifier of the first network or an AMF identifier of the first network sent by a second network element, where the AMF identifier is used to determine the identifier of the first network, and the first network and the second network share the second network element; obtain a locally configured identifier of at least one network that allows simultaneous access of the terminal device; and determine the first information according to whether the at least one network includes the first network.

Optionally, the processing unit 720 is specifically configured to: receive, by using the receiving unit 710, the first information sent by a second network element, where the first information is determined by the second network element according to whether at least one network that allows simultaneous access of the terminal device includes the first network after the second network element obtains a locally configured identifier of the at least one network, and the first network and the second network share the second network element.

Optionally, the second network element is an AMF or UDM.

Optionally, the first network element is any one of the following: an AMF, an SMF, and a UPF.

Optionally, the first network is an NPN, and the second network is a PLMN.

It should be understood that the network device 700 may perform corresponding operations performed by the network device in the foregoing method 300. For brevity, details are not described herein again.

Figure 8:
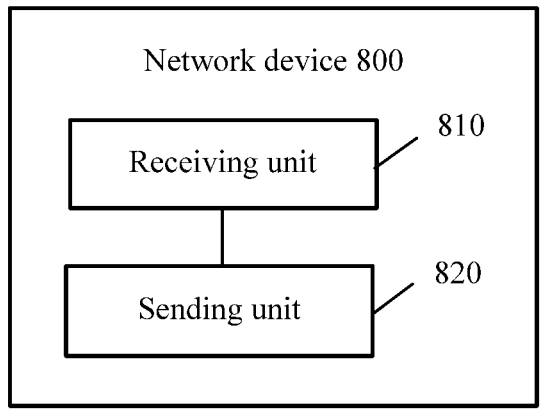
FIG. 8 is a schematic block diagram of a network device according to another embodiment of the present disclosure.

FIG. 8 is a schematic block diagram of a network device 800 according to an embodiment of this application. As shown in FIG. 8, the network device 800 includes: a processing unit 810, configured to determine first information, where the first information is used to indicate whether a terminal device is allowed to simultaneously access the second network when accessing a first network, and the first network and the second network share a second network element; and a sending unit 820, configured to send the first information determined by the processing unit 710 to a first network element, where the first information is used by the first network element to determine whether to send an access denied message or an access allowed message to the terminal device.

Therefore, when the terminal device has accessed the first network and attempts to initiate access to the second network, the second network determines the first information and denies or allows access of the terminal device according to the first information, thereby ensuring that the first network is secure, and a service is correctly performed.

Optionally, the processing unit 810 is specifically configured to: obtain a locally configured identifier of at least one network that allows simultaneous access of the terminal device; and determine the first information according to whether the at least one network includes the first network.

Optionally, the simultaneously accessing a second network when accessing a first network includes: separately accessing, by the terminal device, the first network and the second network; and/or accessing, by the terminal device, the first network, and accessing the second network via the first network.

Optionally, the second network element is an AMF or UDM.

Optionally, the first network element is any one of the following: an AMF, an SMF, and a UPF.

Optionally, the first network is an NPN, and the second network is a PLMN.

It should be understood that the network device 800 may perform corresponding operations performed by the network device in the foregoing method 400. For brevity, details are not described herein again.

Figure 9:
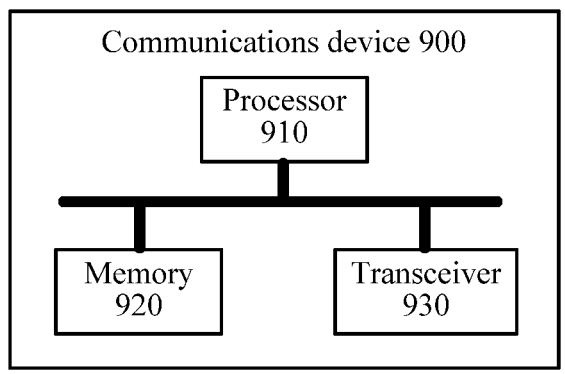
FIG. 9 is a schematic structural diagram of a communications device according to an embodiment of the present disclosure.

FIG. 9 is a schematic structural diagram of a communications device 900 according to an embodiment of this application. The communications device 900 shown in FIG. 9 includes a processor 910. The processor 910 may invoke a computer program from a memory and run the computer program, to implement the method in the embodiments of this application.

Optionally, as shown in FIG. 9, the communications device 900 may further include a memory 920. The processor 910 may invoke the computer program from the memory 920 and run the computer program, to implement the method in the embodiments of this application. The memory 920 may be a component independent of the processor 910 or may be integrated into the processor 910.

Optionally, as shown in FIG. 9, the communications device 900 may further include a transceiver 930. The processor 910 may control the transceiver 930 to communicate with another device. Specifically, information or data may be sent to another device, or information or data may be received from another device. The transceiver 930 may include a transmitter and a receiver. The transceiver 930 may further include an antenna, and there may be one or more antennas.

Optionally, the communications device 900 may be the terminal device in the embodiments of this application, and the communications device 900 can implement corresponding procedures implemented by the terminal device in various methods in the embodiments of this application. For brevity, details are not described herein again.

Optionally, the communications device 900 may be the network device in the embodiments of this application, and the communications device 900 can implement corresponding procedures implemented by the network device in various methods in the embodiments of this application. For brevity, details are not described herein again.

Figure 10:
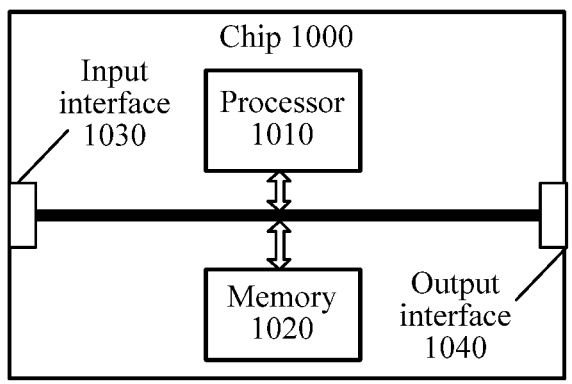
FIG. 10 is a schematic structural diagram of a chip according to an embodiment of the present disclosure.

FIG. 10 is a schematic structural diagram of a chip according to an embodiment of this application. The chip 1000 shown in FIG. 10 includes a processor 1010. The processor 1010 may invoke a computer program from a memory and run the computer program, to implement the method in the embodiments of this application.

Optionally, as shown in FIG. 10, the chip 1000 may further include a memory 1020. The processor 1010 may invoke the computer program from the memory 1020 and run the computer program, to implement the method in the embodiments of this application. The memory 1020 may be a component independent of the processor 1010, or may be integrated into the processor 1010.

Optionally, the chip 1000 may further include an input interface 1030. The processor 1010 may control the input interface 1030 to communicate with another device or chip, and specifically, may obtain information or data sent by another device or chip.

Optionally, the chip 1000 may further include an output interface 1040. The processor 1010 may control the output interface 1040 to communicate with another device or chip, and specifically, may output information or data to another device or chip.

Optionally, the chip may be applied to the terminal device in the embodiments of this application, and the chip can implement corresponding procedures implemented by the terminal device in various methods in the embodiments of this application. For brevity, details are not described herein again.

Optionally, the chip may be applied to the network device in the embodiments of this application, and the chip can implement corresponding procedures implemented by the network device in various methods in the embodiments of this application. For brevity, details are not described herein again.

It should be noted that, the chip mentioned in the embodiments of this application may also be referred to as a system-level chip, a system chip, a chip system, a system on chip or the like.

It should be understood that the processor in the embodiments of this application may be an integrated circuit chip, and has a signal processing capability. During implementation, the steps of the foregoing method embodiments may be implemented by using a hardware integrated logic circuit in the processor or implemented by using an instruction in a software form. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a random access memory (RAM), a flash memory, a read-only memory (ROM), a programmable ROM, an electrically erasable programmable memory, or a register. The storage medium is located in the memory, and the processor reads information in the memory and completes the steps in the foregoing methods in combination with hardware of the processor.

It can be understood that the memory in the embodiments of this application may be a volatile memory or a non-volatile memory, or may include both a volatile memory and a non-volatile memory. The non-volatile memory may be a ROM, a programmable ROM (PROM), an erasable PROM (EPROM), an electrically EPROM (EEPROM) or a flash memory. The volatile memory may be a RAM, and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced synchronous DRAM (ESDRAM), a synchlink DRAM (SLDRAM) and a direct rambus RAM (DR RAM). It should be noted that, the memory for the system and the method described herein intends to include but not limited to these memories and any other suitable types of memories.

It should be understood that the memory is an example but is not intended for limitation. For example, the memory in the embodiments of this application may be alternatively an SRAM, a DRAM, an SDRAM, a DDR SDRAM, an ESDRAM, an SLDRAM, a DR RAM or the like. That is, the memory described in this embodiment of this application intends to include but is not limited to these memories and any other suitable type of memory.

Figure 11:
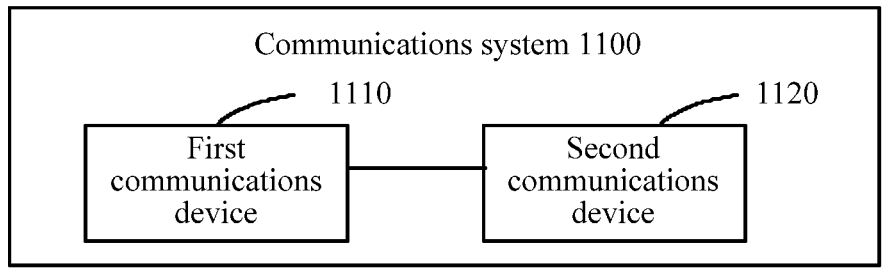
FIG. 11 is a schematic block diagram of a communications system according to an embodiment of the present disclosure.

FIG. 11 is a schematic block diagram of a communications system 1100 according to an embodiment of this application. As shown in FIG. 11, the communications system 1100 includes a network device 1110 and a terminal device 1120.

The terminal device 1120 is configured to: send, when the terminal device 1120 has accessed a first network, an access request message to a first network element of a second network, where the access request message includes indication information, and the indication information is used to indicate that the terminal device has accessed the first network; and receive an access denied message or an access allowed message that is sent by the first network element.

The network device 1110 is the first network element of the second network. The network device 1110 is configured to: receive the access request message sent by the terminal device that has accessed the first network; determine first information, where the first information is used to indicate whether the terminal device is allowed to simultaneously access the second network when accessing the first network; and send the access denied message or the access allowed message to the terminal device according to the first information.

The terminal device 1120 may be configured to implement corresponding functions implemented by the terminal device in the method 300, and components of the terminal device 1120 may be shown as the terminal device 600 in FIG. 6. For brevity, details are not described herein again.

The network device 1110 may be configured to implement corresponding functions implemented by the network device in the method 300, and components of the network device 1110 may be shown as the network device 700 in FIG. 7. For brevity, details are not described herein again.

Figure 12:
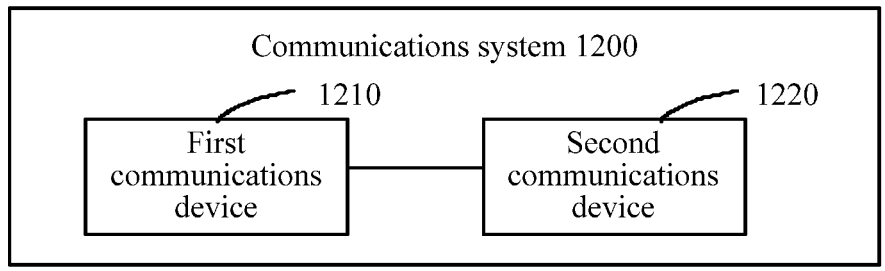
FIG. 12 is a schematic block diagram of a communications system according to another embodiment of the present disclosure.

FIG. 12 is a schematic block diagram of a communications system 1200 according to an embodiment of this application. As shown in FIG. 12, the communications system 1200 includes a network device 1210 and a terminal device 1220.

The terminal device 1220 is configured to: send, when the terminal device 1220 has accessed a first network, an access request message to a first network element of a second network, where the access request message includes indication information, and the indication information is used to indicate that the terminal device has accessed the first network; and receive an access denied message or an access allowed message that is sent by the first network element.

The network device 1210 is a second network element. The network device 1210 is configured to: determine first information when the first network element of the second network receives the access request message sent by the terminal device that has accessed the first network, where the first information is used to indicate whether the terminal device is allowed to simultaneously access the second network when accessing the first network, and the first network and the second network share the second network element; and send the first information to the first network element, where the first information is used by the first network element to determine whether to send the access denied message or the access allowed message to the terminal device.

The terminal device 1220 may be configured to implement corresponding functions implemented by the terminal device in the method 400, and components of the terminal device 1220 may be shown as the terminal device 600 in FIG. 6. For brevity, details are not described herein again.

The network device 1210 may be configured to implement corresponding functions implemented by the network device in the method 400, and components of the network device 1210 may be shown as the network device 800 in FIG. 8. For brevity, details are not described herein again.

An embodiment of this application further provides a computer-readable storage medium, configured to store a computer program. Optionally, the computer-readable storage medium may be applied to the network device in the embodiments of this application, and the computer program enables a computer to implement corresponding procedures implemented by the network device in various methods in the embodiments of this application. For brevity, details are not described herein again. Optionally, the computer-readable storage medium may be applied to the terminal device in the embodiments of this application, and the computer program enables a computer to implement corresponding procedures implemented by the terminal device in various methods in the embodiments of this application. For brevity, details are not described herein again.

An embodiment of this application further provides a computer program product, including a computer program instruction. Optionally, the computer program product may be applied to the network device in the embodiments of this application, and the computer program instruction enables a computer to implement corresponding procedures implemented by the network device in various methods in the embodiments of this application. For brevity, details are not described herein again. Optionally, the computer program product may be applied to the terminal device in the embodiments of this application, and the computer program instruction enables a computer to implement corresponding procedures implemented by the terminal device in various methods in the embodiments of this application. For brevity, details are not described herein again.

An embodiment of this application further provides a computer program. Optionally, the computer program may be applied to the network device in the embodiments of this application, and when run on a computer, the computer program enables the computer to implement corresponding procedures implemented by the network device in various methods in the embodiments of this application. For brevity, details are not described herein again. Optionally, the computer program may be applied to the terminal device in the embodiments of this application, and when run on a computer, the computer program enables the computer to implement corresponding procedures implemented by the terminal device in various methods in the embodiments of this application. For brevity, details are not described herein again.

It should be understood that the terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

It should be understood that in the embodiments of the present disclosure, "B corresponding to (related to) A" indicates that B is associated with A, and B may be determined based on A. However, it should further be understood that determining B according to A does not mean that B is determined according to A only; that is, B may be alternatively determined according to A and/or other information.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiments are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiments of this application. The foregoing storage medium includes: any medium that can store program code, such as a Universal Serial Bus (USB) flash drive, a removable hard disk, a ROM, a RAM, a magnetic disk or an optical disc.

The descriptions are only specific implementations of this application, but are not intended to limit the scope of protection of this application. Any variation or replacement readily figured out by persons skilled in the art within the technical scope disclosed in this application shall fall within the scope of protection of this application. Therefore, the scope of protection of this application shall be subject to the scope of protection of the claims.

What is claimed is:

1. A method for network access, comprising:
obtaining, by a terminal device, first information, wherein the first information is used to indicate whether the terminal device is allowed to simultaneously access a second network when accessing a first network; and
determining, by the terminal device according to the first information, whether to initiate an access request to the second network when the terminal device accesses the first network,
wherein the obtaining, by a terminal device, first information comprises:
receiving the first information sent by a second network element of the second network before the terminal device accesses the first network.

2. The method according to claim 1, wherein the simultaneously accessing a second network when accessing a first network comprises at least one of:
separately accessing, by the terminal device, the first network and the second network; or
accessing, by the terminal device, the first network, and accessing the second network via the first network.

3. The method according to claim 1, wherein the second network element is an access and mobility management function (AMF) or unified data management (UDM).

4. The method according to claim 1, wherein the obtaining, by a terminal device, first information comprises:
receiving the first information sent by a first network element of the first network after the terminal device accesses the first network.

5. The method according to claim 4, wherein the first network element is any one of the following: an access and mobility management function (AMF), a session management function (SMF), or a user plane function (UPF).

6. The method according to claim 1, wherein the first network is a non-public network (NPN), and the second network is a public land mobile network (PLMN).

7. The method according to claim 1, wherein the first information comprises an identifier of the first network and a corresponding bit, and a value of the bit indicates whether the terminal device is allowed to access the second network when accessing the first network.

8. The method according to claim 7, wherein the value of 1 indicates that simultaneous access is allowed, and the value of 0 indicates that simultaneous access is not allowed.

9. A terminal device, comprising:
a transceiver;
a memory configured to store a computer program; and
a processor configured to invoke and run the computer program stored in the memory,
wherein the processor is configured to obtain first information, wherein the first information is used to indicate whether the terminal device is allowed to simultaneously access a second network when accessing a first network; and
the processor is further configured to determine, according to the first information, whether to initiate an access request to the second network when the terminal device accesses the first network,
wherein the processor is further configured to:
receive, by using the transceiver, the first information sent by a second network element of the second network before the terminal device accesses the first network.

10. The terminal device according to claim 9, wherein the simultaneously accessing a second network when accessing a first network comprises at least one of:
separately accessing, by the terminal device, the first network and the second network; or
accessing, by the terminal device, the first network, and accessing the second network via the first network.

11. The terminal device according to claim 9, wherein the second network element is an access and mobility management function (AMF) or unified data management (UDM).

12. The terminal device according to claim 9, further comprising a transceiver, wherein the processor is further configured to:
receive, by using the transceiver, the first information sent by a first network element of the first network after the terminal device accesses the first network.

13. The terminal device according to claim 12, wherein the first network element is any one of the following:
an access and mobility management function (AMF), a session management function (SMF), and a user plane function (UPF).

14. The terminal device according to claim 9, wherein the first network is a non-public network (NPN), and the second network is a public land mobile network (PLMN).

15. The terminal device according to claim 9, wherein the first information comprises an identifier of the first network and a corresponding bit, and a value of the bit indicates whether the terminal device is allowed to access the second network when accessing the first network.

16. The terminal device according to claim 15, wherein the value of 1 indicates that simultaneous access is allowed, and the value of 0 indicates that simultaneous access is not allowed.

* * * * *